United States Patent
Hung et al.

(10) Patent No.: US 11,125,265 B2
(45) Date of Patent: Sep. 21, 2021

(54) INSULATING CARABINER HOOK AND INSULATING GATE FOR CARABINER HOOK AND MANUFACTURING METHOD THEREOF

(71) Applicant: YOKE INDUSTRIAL CORP., Taichung (TW)

(72) Inventors: Wei-Chieh Hung, Taichung (TW); Chia-Hsien Wang, Shengang Township (TW); Ya-Chun Cheng, Ershui Township (TW)

(73) Assignee: YOKE INDUSTRIAL CORP., Taichung (TW)

( * ) Notice: Subject to any disclaimer, the term of this patent is extended or adjusted under 35 U.S.C. 154(b) by 0 days.

(21) Appl. No.: 16/664,017

(22) Filed: Oct. 25, 2019

(65) Prior Publication Data
US 2021/0123471 A1  Apr. 29, 2021

(51) Int. Cl.
*F16B 45/02* (2006.01)
*B29C 45/14* (2006.01)
*B29K 705/00* (2006.01)

(52) U.S. Cl.
CPC ........ *F16B 45/02* (2013.01); *B29C 45/14336* (2013.01); *B29K 2705/00* (2013.01)

(58) Field of Classification Search
CPC ............... F16B 45/02; B29C 45/14336; B29C 2045/14368; B29C 45/14344; B29K 2705/00
See application file for complete search history.

(56) References Cited

U.S. PATENT DOCUMENTS

| 8,060,994 B2 * | 11/2011 | Petzl | F16B 45/02 24/600.2 |
| 9,199,105 B1 | 12/2015 | Hung | |
| 2017/0307004 A1 * | 10/2017 | Cardella | E05B 15/102 |

FOREIGN PATENT DOCUMENTS

| EP | 2034198 A1 | 3/2009 |
| EP | 2341256 A2 | 7/2011 |
| JP | H07229510 A | 8/1995 |

OTHER PUBLICATIONS

Extended European search report for EP19205874.1, dated Apr. 9, 2020, Total of 10 pages.
English abstract for EP2034198, Total of 1 page.
English abstract for JPH07229510, Total of 1 page.

* cited by examiner

*Primary Examiner* — Robert Sandy
*Assistant Examiner* — Louis A Mercado
(74) *Attorney, Agent, or Firm* — Tracy M Heims; Apex Juris, pllc.

(57) ABSTRACT

An insulating carabiner hook is characterized in that a free end of an insulating gate includes a first insulating section and a second insulating section. A color of the second insulating section is different from a color of the first insulating section. A restricting sleeve could move along an axial direction of the insulating gate. When the free end abuts against an abutting portion of an insulating body, and the restricting sleeve completely covers the second insulating section, the restricting sleeve is located at a safe position and cannot freely pivot. When at least a part of the second insulating section is exposed via the restricting sleeve, the restricting sleeve is located at a warning position. An insulating gate and a manufacturing method thereof are also disclosed.

15 Claims, 18 Drawing Sheets

INSULATING CARABINER HOOK AND INSULATING GATE FOR CARABINER HOOK AND MANUFACTURING METHOD THEREOF

BACKGROUND OF THE INVENTION

Technical Field

The present invention is related to a carabiner hook, and more particularly to an insulating carabiner hook, an insulating gate for a carabiner hook, and a manufacturing method of the insulating gate.

Description of Related Art

For workers working in elevated workplaces or for extreme sports players, seat belts and safety hooks have been widely used in related fields and have a direct impact on the life safety of these users.

For example, workers working in elevated workplaces (such as construction workers, electricians, glass cleaners of high building, etc.) must do specific work in the air for long periods of time, and must wear protective clothing according to safety rules (for example, safety helmets, safety belts, and safety hooks, etc. However, even the workers have worn the protective clothing in accordance with the safety rules, accidents that the workers fall occur at times.

In addition, extreme sports in recent years (such as bungee jumping, hang gliding, sky diving, etc.) have attracted many players to try such highly risky sports. However, in the news reports, the extreme sports players fall at times due to negligent inspection of the safety equipment, causing serious personal injury and even death.

Examining some of the reasons, the safety hooks of the protective clothing or the safety equipment are not properly locked according to the rules, so that the workers working in elevated workplaces and the extreme sports players fall due to the safety hook buckles are loosened.

Therefore, the conventional safety hook buckle still has room for improvements.

BRIEF SUMMARY OF THE INVENTION

In view of the above, the purpose of the present invention is to provide an insulating carabiner hook, wherein a user could easily identify whether the insulating carabiner hook is properly locked to be a safe state by different colors between a first insulating section and a second insulating section and by an easy security checking process, thereby to protect the safety of the user and enhance the convenience of use.

The present invention provides an insulating carabiner hook, including an insulating body, an insulating gate, and a restricting sleeve, wherein the insulating body has a connecting portion and an abutting portion respectively located on two opposite ends of the insulating body. The insulating gate has a connecting end, a free end, and an external threaded section, wherein the external threaded section is located between the connecting end and the free end. The insulating gate is pivotally connected to the connecting portion of the insulating body via the connecting end, thereby the insulating gate is pivotable to be pivot relative to the insulating body. The free end is operable to be abutted against or away from the abutting portion of the insulating body, and includes a first insulating section and a second insulating section. The second insulating section is located between the first insulating section and the external threaded section. A color of the second insulating section is different from a color of the first insulating section. The restricting sleeve has an internal threaded section and fitting around the insulating gate, wherein the internal threaded section is screwed with the external threaded section of the insulating gate; the restricting sleeve is operable to rotate, thereby the restricting sleeve is movable to be moved in an axial direction of the insulating gate. When the free end abuts against the abutting portion of the insulating body, and the restricting sleeve completely covers the second insulating section and covers at least a part of the abutting portion of the insulating body, the restricting sleeve is defined as being located in a safe position, and at this time, the insulating gate cannot freely pivot. When the free end abuts against the abutting portion of the insulating body, and at least a part of the second insulating section of the insulating gate is exposed via the restricting sleeve (30), the restricting sleeve (30) is defined as being located at a warning position.

In addition, the another primary objective of the present invention is to provide an insulating gate for a carabiner hook, including a core material, a first insulating layer, and a second insulating layer, wherein the core material comprises a free end and a connecting end. The first insulating layer is provided on a surface of the core material, and forms an external threaded section between the free end and the connecting end. The first insulating layer includes a first insulating section and a second insulating section on the free end. The second insulating section is located between the first insulating section and the external threaded section. A part of the core material corresponding to the first insulating section is coated with the first insulating layer, and a part of the core material corresponding to the second insulating section is partially coated with the first insulating layer. A part of the first insulating layer corresponding to the second insulating section is coated with the second insulating layer, and a part of the core material corresponding to the second insulating section is coated with the second insulating layer. A color of the second insulating section is different from a color of the first insulating section.

Moreover, the still another primary objective of the present invention is to provide a manufacturing method of an insulating gate for a carabiner hook, including steps of: provide a core material and a first mold, wherein the core material is disposed in a first mold cavity of the first mold, and has a first section, a second section, and a third section; the first mold cavity has a first area, a second area, and a third area; the first section is disposed within the first area; the second section is disposed within the second area; the third section is disposed within the third area; form a first molding space between the first section and an inner wall of the first area; form a second molding space between the second section and an inner wall of the second area; form a third molding space between the third section and an inner wall of the third area, wherein the second molding space communicates with the first molding space and the third molding space; inject a first insulating material into the first mold cavity, wherein the first insulating material fills the first molding space, the second molding space, and the third molding space, thereby to form a first insulating layer on a surface of the core material to obtain a semi-finished product; the semi-finished product has a first section, a second section, and a third section; when the semi-finished product is disposed in a second mold cavity of a second mold, the first section and the third section of the semi-finished product abut against an inner wall of the second mold cavity, and a fourth molding space is formed between the second section of the semi-finished product and the inner wall of the second mold cavity; inject a second insulating material into the fourth molding space, wherein the second insulating material fills the fourth molding space, thereby to form a second insulating layer on a part of a surface of the core material and a part of the first insulating layer corresponding to the second section of the semi-finished product to obtain the insulating gate.

With the different colors between the first insulating section and the second insulating section and with the easy security checking process, the user could easily identify whether the insulating carabiner hook is properly locked to be the safety state or not, thereby to protect the safety of the user and enhance the convenience of use. In addition, the entire outer surface of the insulating carabiner hook is coated with the insulating material, thereby to avoid electric shock or electric conduction occurring on the carabiner hook, providing further safety protection for electric maintenance staffs.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
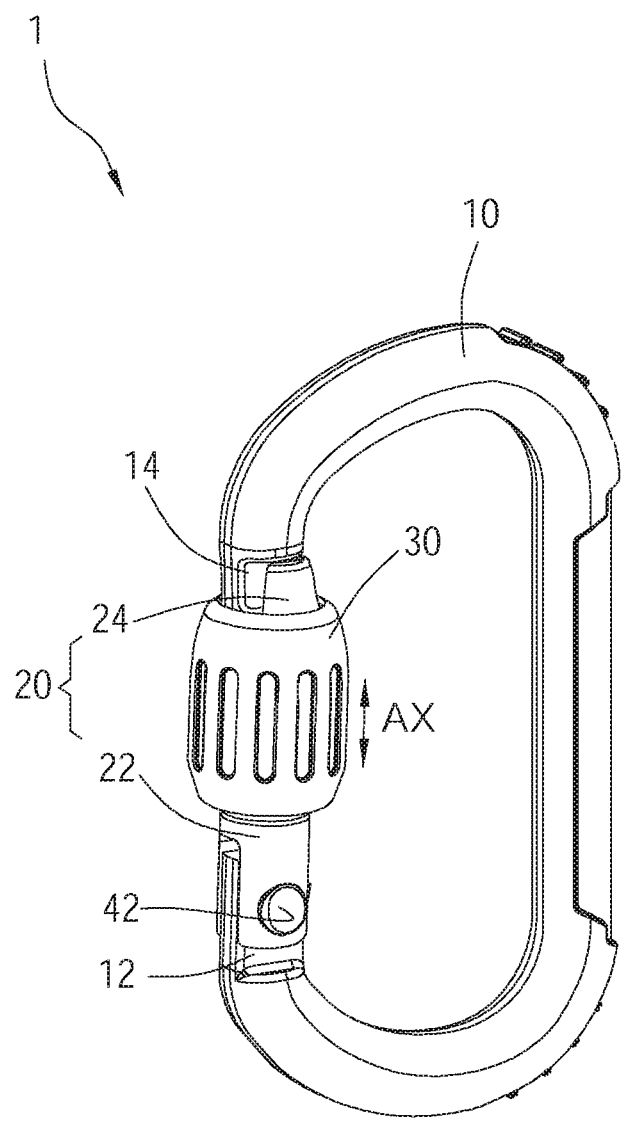
FIG. 1 is a perspective view of the insulating carabiner hook according to an embodiment of the present invention.
Figure 2:
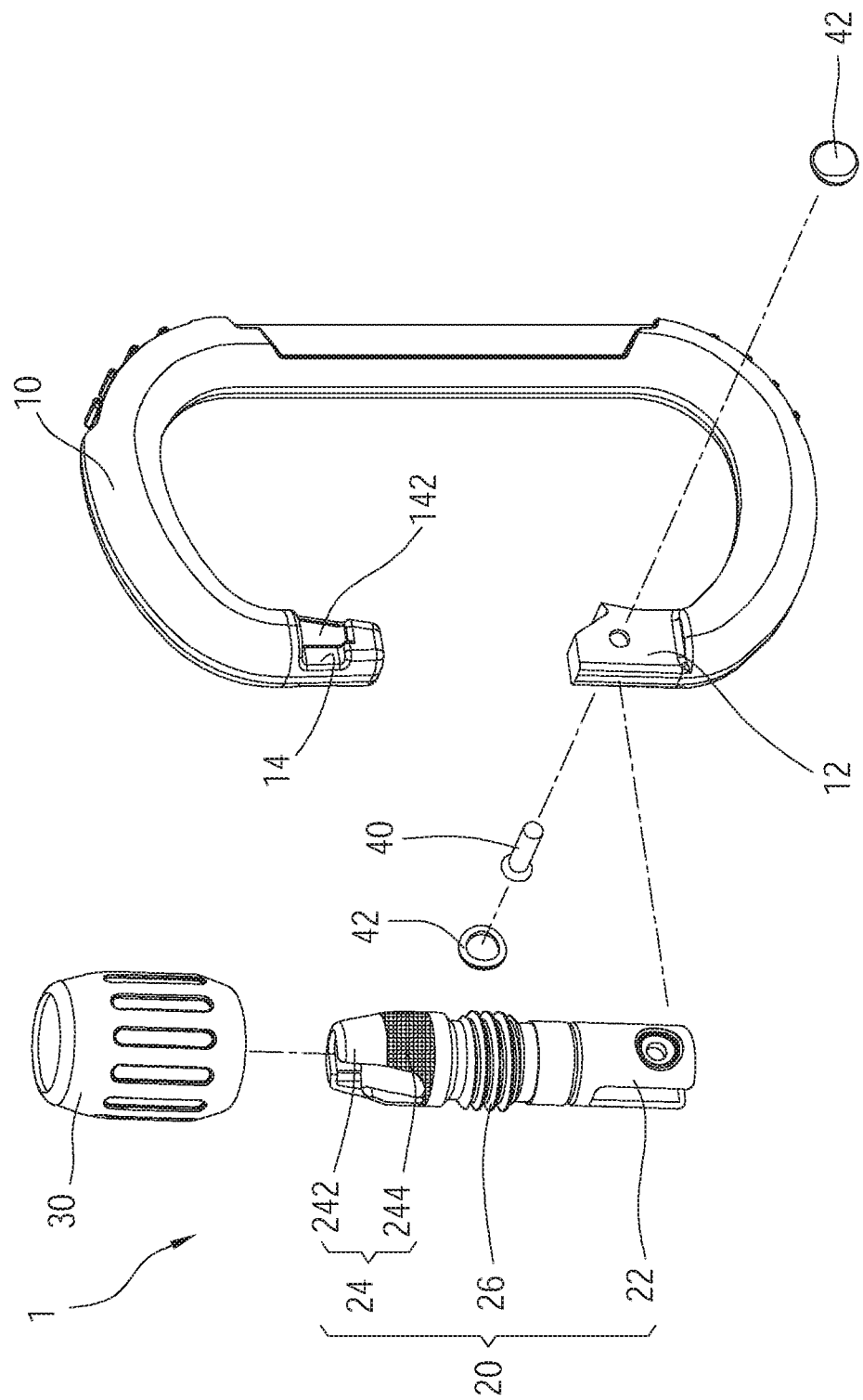
FIG. 2 is an exploded view, showing the components of the insulating carabiner hook according to the embodiment of the present invention shown in FIG. 1.
Figure 9A:
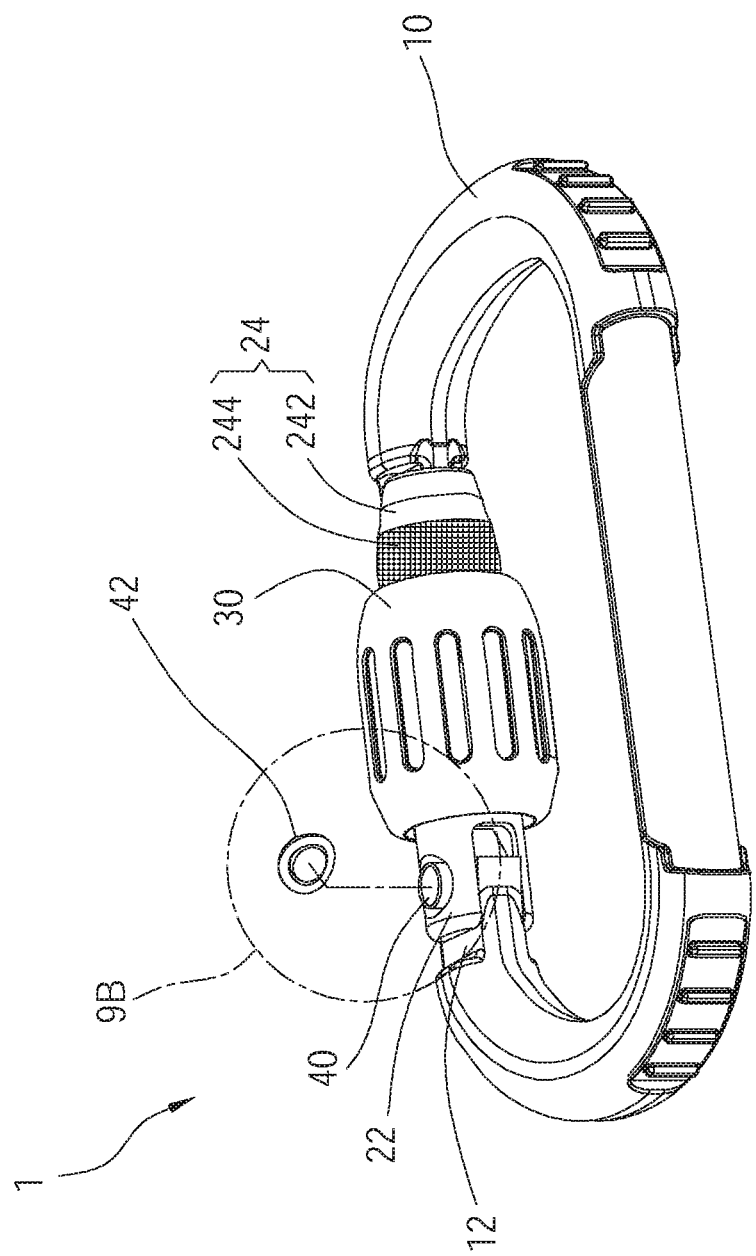
FIG. 9A is an exploded partial view of FIG. 1.

An insulating carabiner hook 1 according to an embodiment of the present invention is illustrated in FIG. 1, FIG. 2, and FIG. 9A, and includes an insulating body 10, an insulating gate 20, a restricting sleeve 30 which is insulated, and a pivot 40.

The insulating body 10 has a connecting portion 12 and an abutting portion 14 respectively located on two ends of the insulating body 10. The insulating gate 20 has a connecting end 22, a free end 24, and an external threaded section 26, wherein the external threaded section 26 is located between the connecting end 22 and the free end 24.

The insulating gate 20 is pivotally connected to the connecting portion 12 of the insulating body 10 via the connecting end 22, so that the insulating gate 20 could pivot relative to the insulating body 10. The free end 24 is operable to be abutted against or away from the abutting portion 14 of the insulating body 10, and includes a first insulating section 242 and a second insulating section 244, wherein the second insulating section 244 is located between the first insulating section 242 and the external threaded section 26. A color of the second insulating section 244 is different from a color of the first insulating section 242.

The restricting sleeve 30 fits around the insulating gate 20 and has an internal threaded section, wherein the internal threaded section is screwed with the external threaded section 26 of the insulating gate 20. The restricting sleeve 30 is operable to rotate, so that the restricting sleeve 30 could be moved in an axial direction AX of the insulating gate 20.

When the free end 24 abuts against the abutting portion 14 of the insulating body 10, and the restricting sleeve 30 completely covers the second insulating section 244 of the insulating gate 24 and covers at least a part of the abutting portion 14 of the insulating body 10, the restricting sleeve 30 is defined as being located in a safe position, as shown in FIG. 1, and could not freely pivot. When the free end 24 abuts against the abutting portion 14 of the insulating body, and at least a part of the second insulating section 244 is not covered by the restricting sleeve 30 to be exposed, the restricting sleeve 244 is defined as being located at a warning position, as shown in FIG. 9A. In the current embodiment, a user could easily identify whether the insulating carabiner hook 1 is locked properly to be in a safe state or not by different colors of the second insulating section 244 and the first insulating section 242 and by an easy security checking process, thereby to provide safety protection for the user. In addition, an entire outer surface of the insulating carabiner hook 1 is coated by an insulating material, thereby to avoid electric shock or electric conduction occurring on the carabiner hook, providing further safety protection for electric maintenance staffs.

In the current embodiment, when the free end 24 of the insulating gate 20 abuts against the abutting portion 14 of the insulating body 10, and the restricting sleeve 30 is located at the warning position, at least a part of the second insulating section 244 of the insulating gate 20 is exposed via the restricting sleeve 30, and the free end 24 of the insulating gate 20 could not firmly abut against the abutting portion 14 of the insulating body 10.

In an embodiment, when the free end 24 of the insulating gate 20 abuts against the abutting portion 14 of the insulating body 10, and the restricting sleeve 30 is located at the warning position, at least a part of the second insulating section 244 of the insulating gate 20 is exposed via the restricting sleeve 30, and the insulating gate 20 could freely pivot relative to the insulating body 10.

Figure 3A:
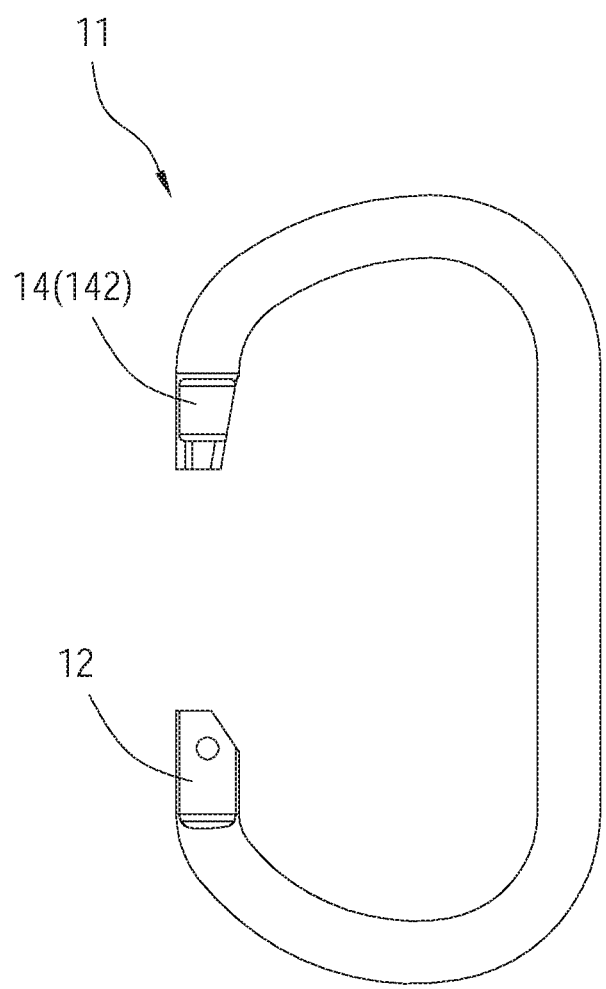
FIG. 3A is a schematic view, showing the core material of the insulating body of the insulating carabiner hook according to the embodiment of the present invention.
Figure 3B:
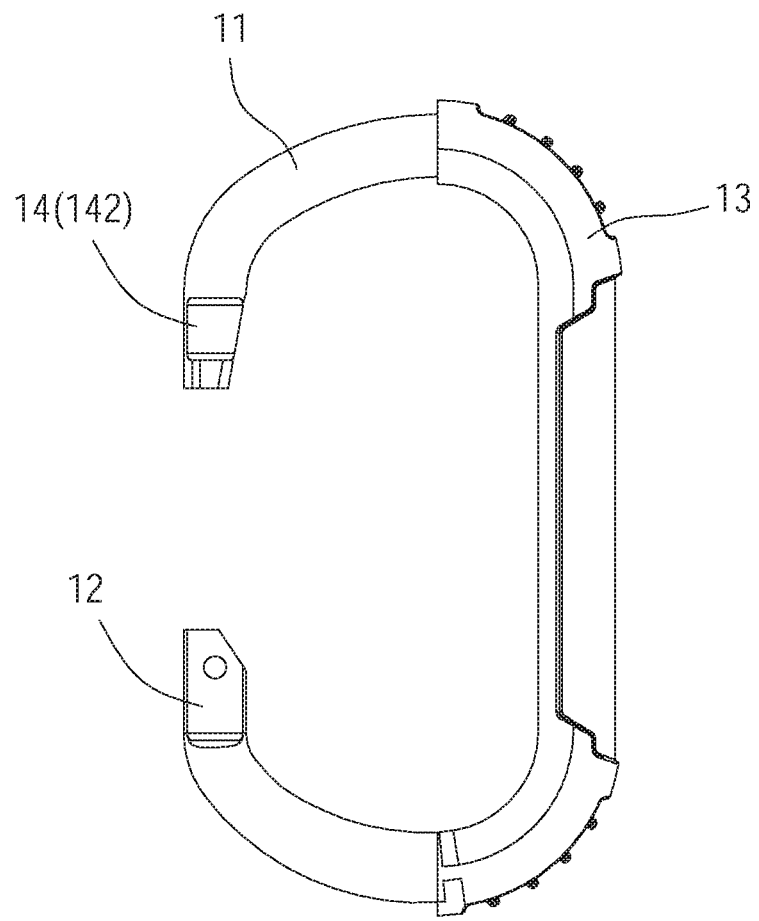
FIG. 3B is a schematic view, showing a part of the core material of the insulating body of the insulating carabiner hook according to the embodiment of the present invention is coated with the insulating layer.
Figure 3C:
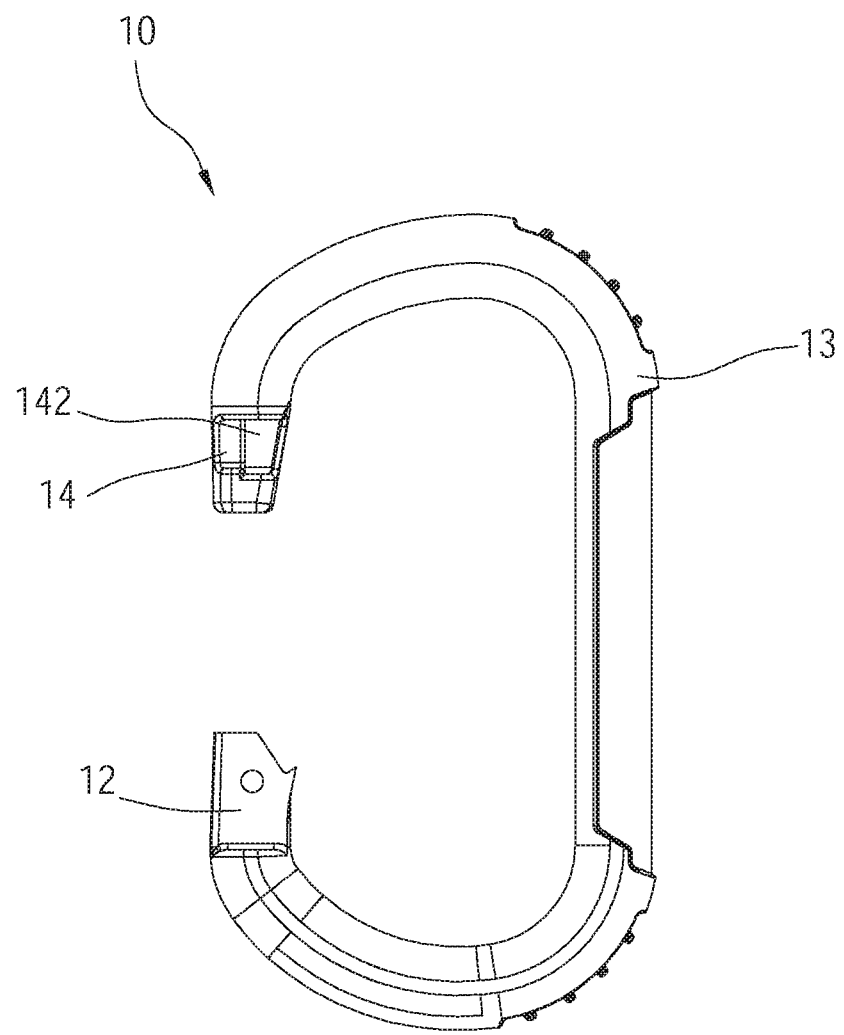
FIG. 3C is a schematic view, showing another part of the core material of the insulating body of the insulating carabiner hook according to the embodiment of the present invention is coated with the insulating layer.
Figure 4:
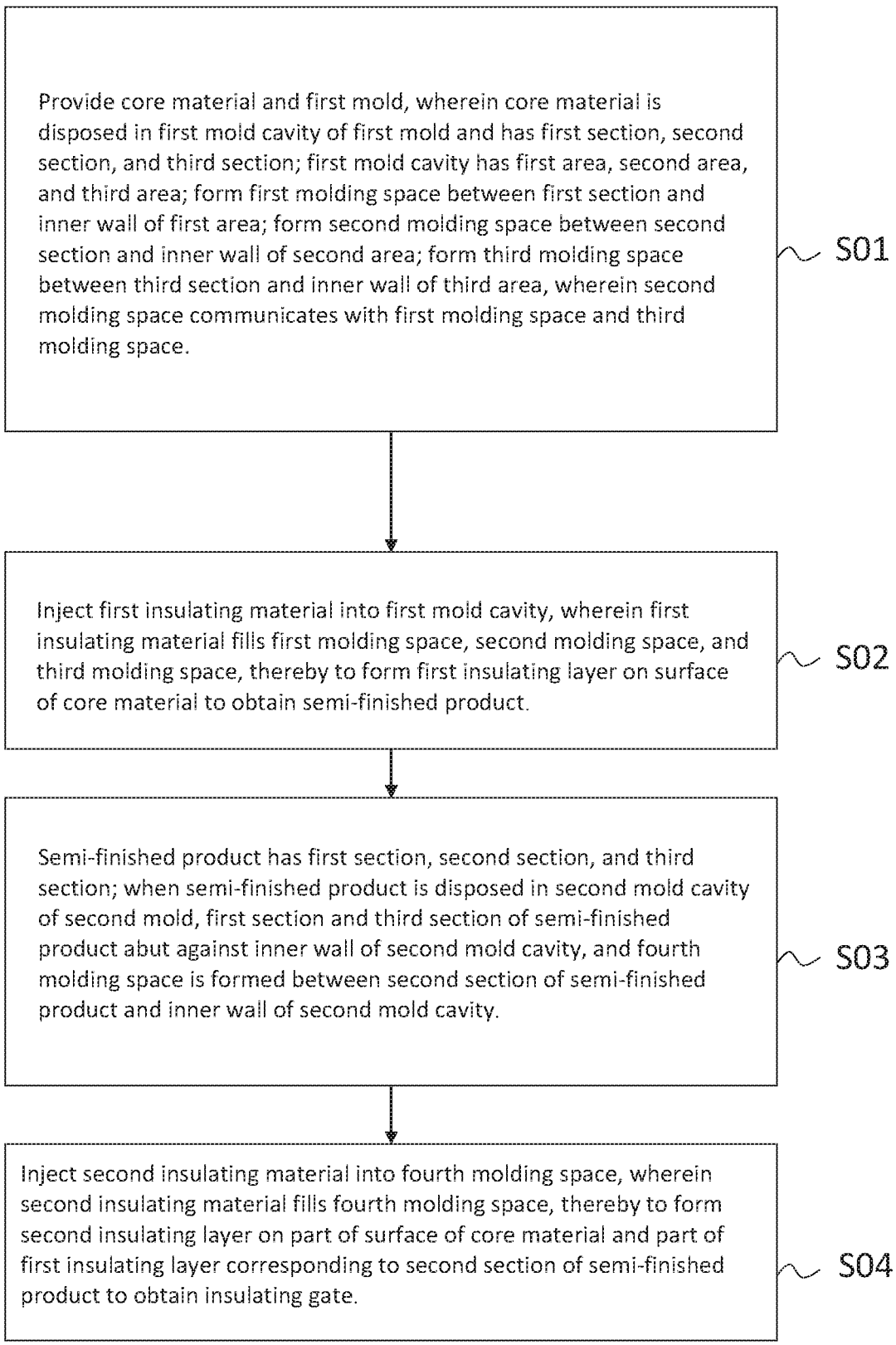
FIG. 4 is a flowchart of the manufacturing method of the insulating gate of the carabiner hook according to the embodiment of the present invention.

As shown in FIG. 3A to FIG. 3C, the insulating body 10 includes a core material 11 and an insulating layer 13, wherein the core material 11 is coated by the insulating layer 13. A part of the core material 11 of the insulating body 10 located at the abutting portion 14 is not entirely coated by the insulating layer 13, so that a part of the core material 11 located at the abutting portion 14 is exposed out, as shown in FIG. 3C. As shown in FIG. 3A, the core material 11 includes the connecting portion 12 and the abutting portion 14, wherein the abutting portion 14 has an outer surface 142. Reference is next made to FIG. 3B, a left-half portion of the core material 11 is held in a mold (not shown), so that a right-half portion of the core material 11 is suspended in the mold, and the insulating layer 13 is formed on a surface of the right-half portion of the core material 11. Reference is next made to FIG. 3C, the right-half portion of the core material 11 coated with the insulating layer 13 is held in another mold (not shown), so that the left-half portion of the core material 11 is suspended in the another mold, and the insulating layer 13 is formed on a surface of the left-half portion of the core material 11, wherein a part of the outer surface 142 of the abutting portion 14 of the insulating body 10 is not coated by the insulating layer 13 to be exposed out.

Figure 5A:
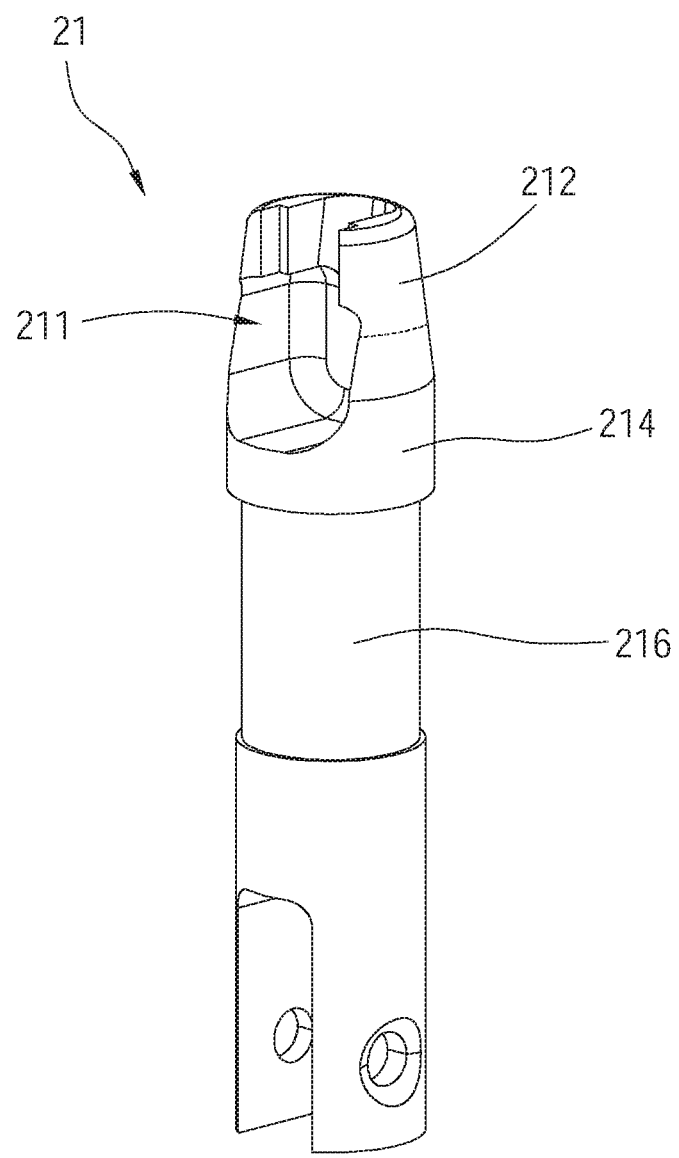
FIG. 5A is a schematic view, showing the core material of the insulating gate of the insulating carabiner hook according to the embodiment of the present invention.
Figure 5B:
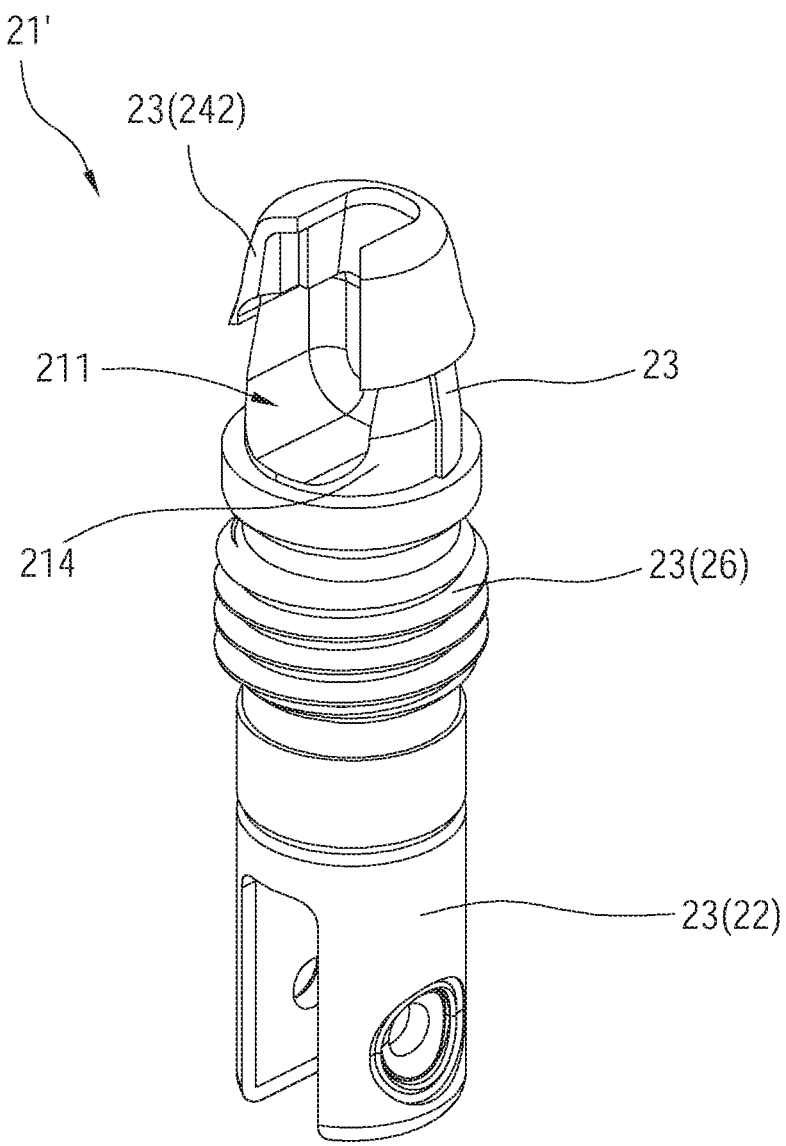
FIG. 5B is a schematic view, showing a part of the core material of the insulating gate of the insulating carabiner hook according to the embodiment of the present invention is coated with the first insulating layer.
Figure 5C:
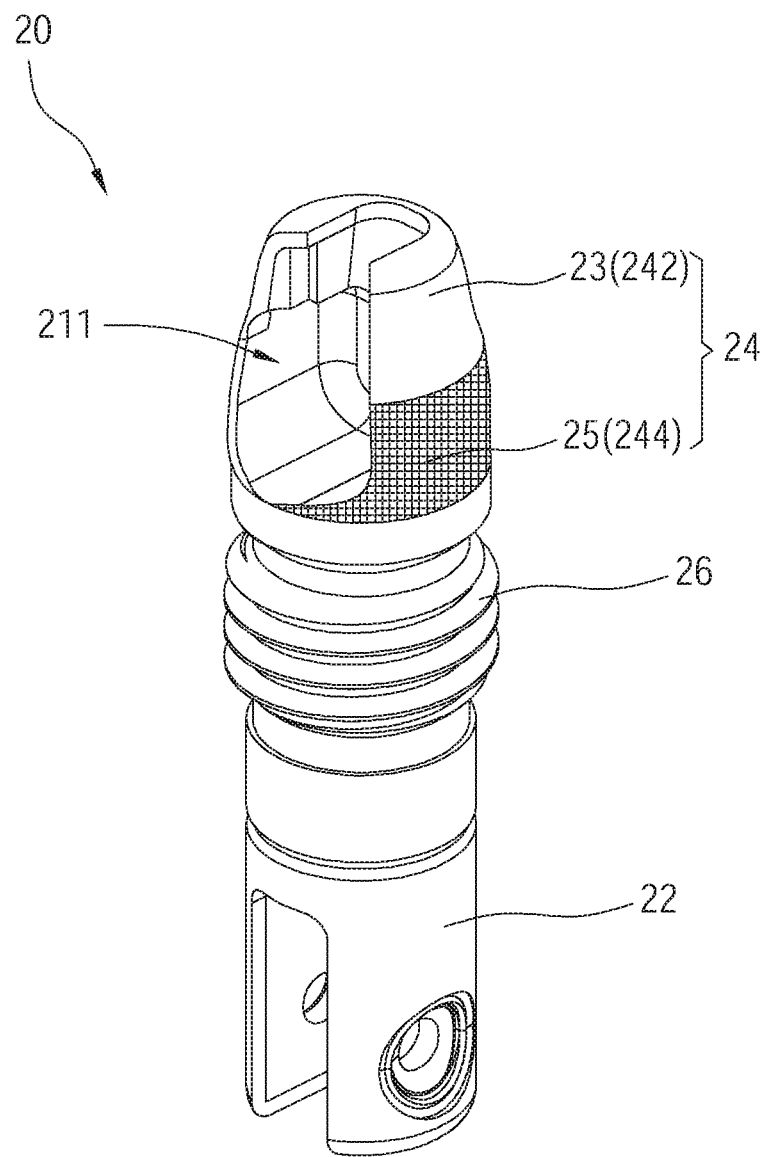
FIG. 5C is a schematic view, showing another part of the core material of the insulating gate of the insulating carabiner hook according to the embodiment of the present invention is coated with the second insulating layer.

As shown in FIG. 4 to FIG. 7B, FIG. 4 is a flowchart of a manufacturing method of the insulating gate of the carabiner hook according to the embodiment of the present invention which includes the following steps:

Step S01, a core material 21 of the insulating gate 20 and a first mold 50 is provided, wherein the core material 21 is disposed in a first mold cavity 52 of the first mold 50; the core material 21 has a first section 212, a second section 214, and a third section 216, and the first mold cavity 52 has a first area, a second area, and a third area, wherein the first section 212 is disposed within the first area, the second section 214 is disposed within the second area, and the third section 216 is disposed within the third area; a first molding space 522 is formed between the first section 212 and an inner wall of the first area; a second molding space 524 is formed between the second section 214 and an inner wall of the second area; a third molding space 526 is formed between the third section 216 and an inner surface of the third area, wherein the second molding space 524 communicates with the first molding space 522 and the third molding space 526;

Step S02, a first insulating material is injected into the first mold cavity 52, and fills the first molding space 522, the second molding space 524, and the third molding space 526, thereby to form a first insulating layer 23 on a surface of the core material 21 so as to obtain a semi-finished product 21', as shown in FIG. 5B;

Step S03, the semi-finished product 21' has a first section 212', a second section 214', and a third section 216'; when the semi-finished product 21' is disposed in a second mold cavity 62 of a second mold 60, the first section 212' and the third section 216' abut against an inner wall of the second mold cavity 62, while a fourth molding space 622 is formed between the second section 214' and the inner wall of the second mold cavity 62;

Step S04, a second insulating material is injected into the fourth molding space 622, and fills the fourth molding space 622, thereby to form a second insulating layer 25 on the surface of the core material 21 of the insulating gate 20 and the first insulating layer 23 corresponding to the second section 214' of the semi-finished product 21', so as to obtain the insulating gate 20.

As shown in FIG. 5A, the core material 21 of the insulating gate 20 has the first section 212, the second section 214, and the third section 216, in order from the free end 24 to the connecting end 22, wherein a recess 211 is formed on a combination of the first section 212 and the second section 214 of the core material 21, and has an inner surface.

Figure 6A:
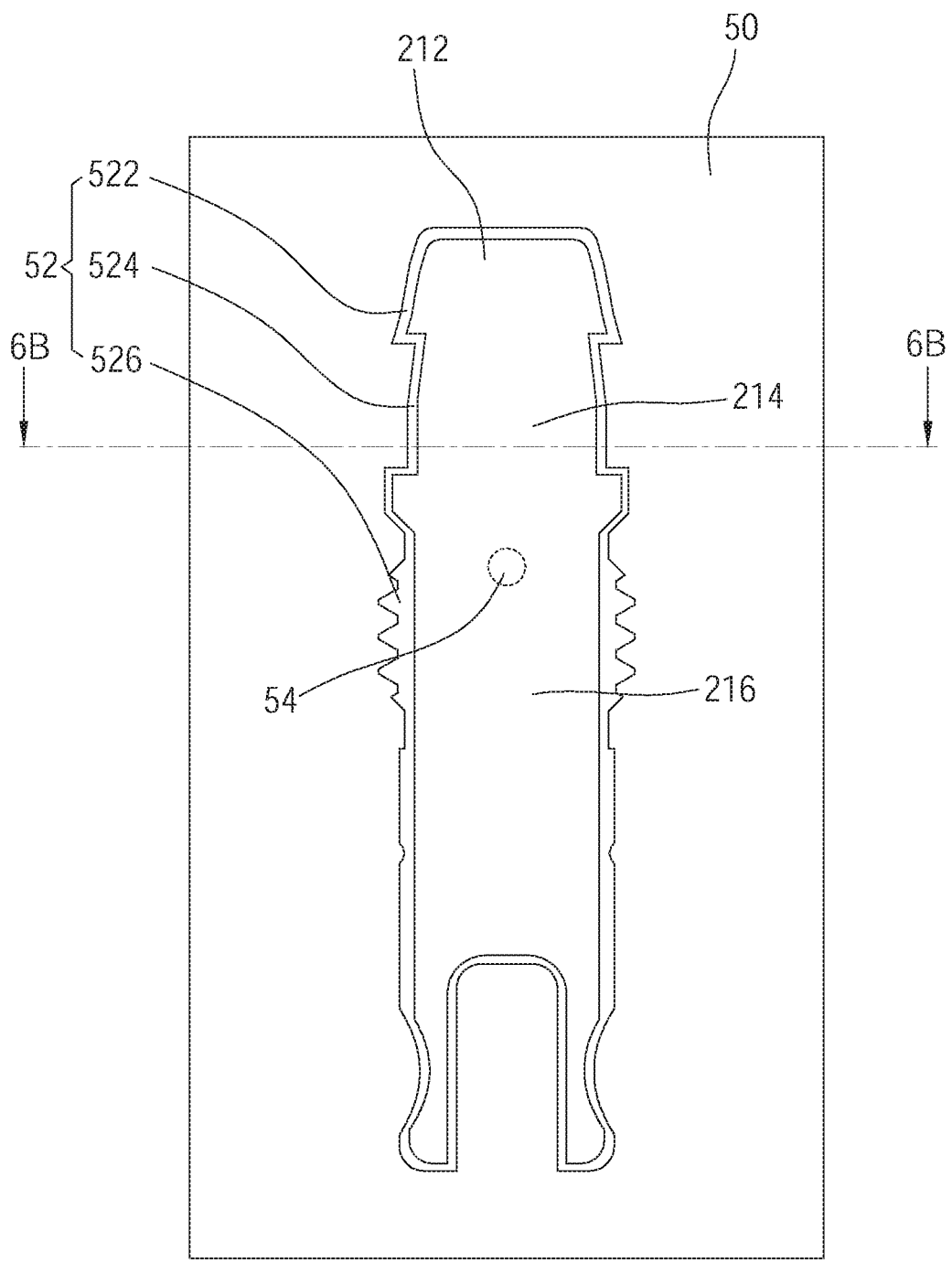
FIG. 6A is a schematic view, showing the core material of the insulating gate is disposed in the first mold.

As shown in FIG. 6A, the first molding space 522 is formed between the first section 212 and the inner wall of the first area; the second molding space 524 is formed between the second section 214 and the inner wall of the second area; the third molding space 526 is formed between the third section 216 and the inner surface of the third area, wherein the second molding space 524 communicates with the first molding space 522 and the third molding space 526. In the current embodiment, the first mold 50 has an injecting hole 54 communicating with the third area (i.e. the third molding space 526) of the first mold cavity 52. In the current embodiment, the first insulating material, which is plastic as an example, is injected into the third area of the first mold cavity 52 via the injecting hole 54, and sequentially flows through and fills the third molding space 526, the second molding space 524, and the first molding space 522.

As shown in FIG. 5A, the first section 212 of the core material 21 of the insulating gate 20 has a first outer surface, the second section 214 has a second outer surface, and the third section 216 has a third outer surface. The first outer surface, the third outer surface, and a part of the second outer surface are coated with the first insulating layer 23, wherein the first insulating layer 23 forms the external threaded section 26 on the outer surface of the third section 216 of the core material 21, as shown in FIG. 5B.

Figure 6B:
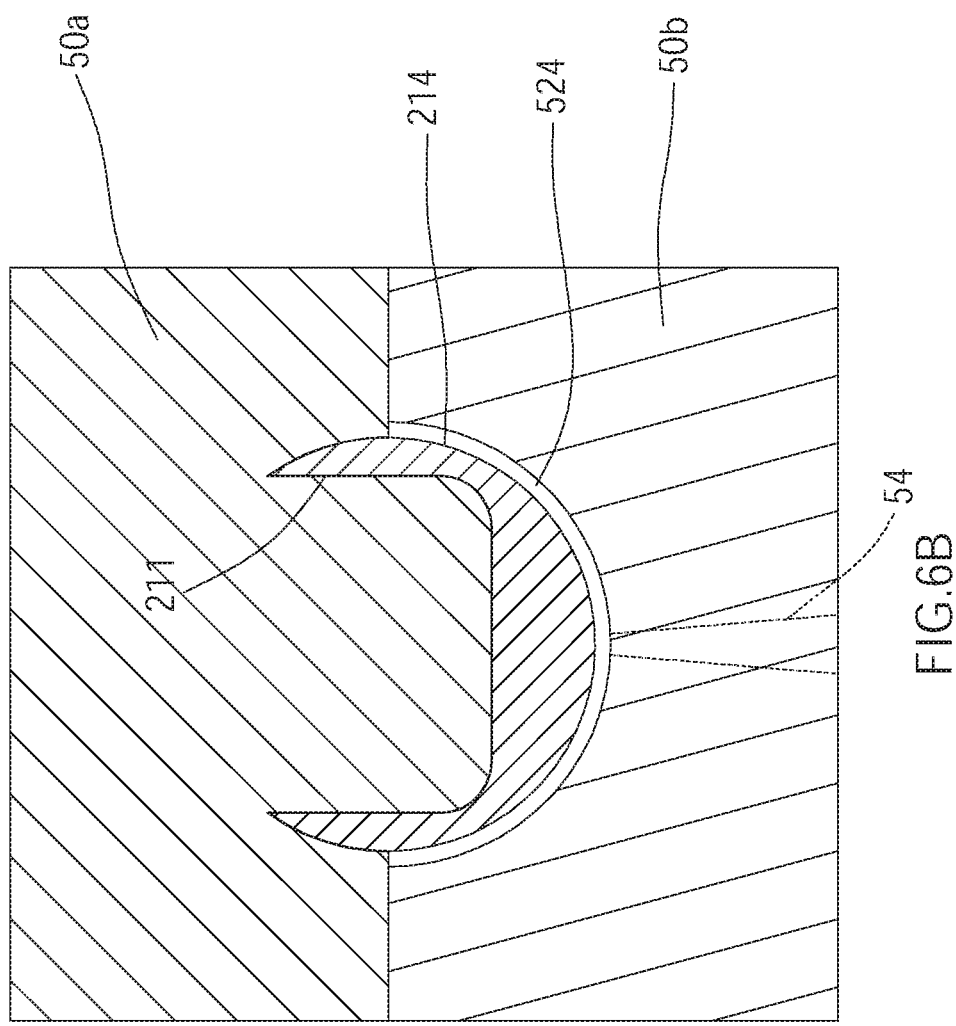
FIG. 6B is a sectional view along the 6B-6B line in FIG. 6A.

As shown in FIG. 6B, the first mold 50 includes an upper mold 50a and a lower mold 50b which could be engaged with each other to constitute the first mold 50, wherein the upper mold 50a is in contact with the inner surface of the recess 211 of the core material 21 of the insulating gate 20 and a part of an outer surface of the core material 21 of the insulating gate 20, and the second molding space 524 is formed between the lower mold 50b and the second section 214 of the core material 21 of the insulating gate 20. When the first insulating material is injected into the first mold cavity 52 via the injecting hole 54, the first insulating material fills the second molding space 524, thereby to form the first insulating layer 23 on the second outer surface of the second section 214.

Figure 7A:
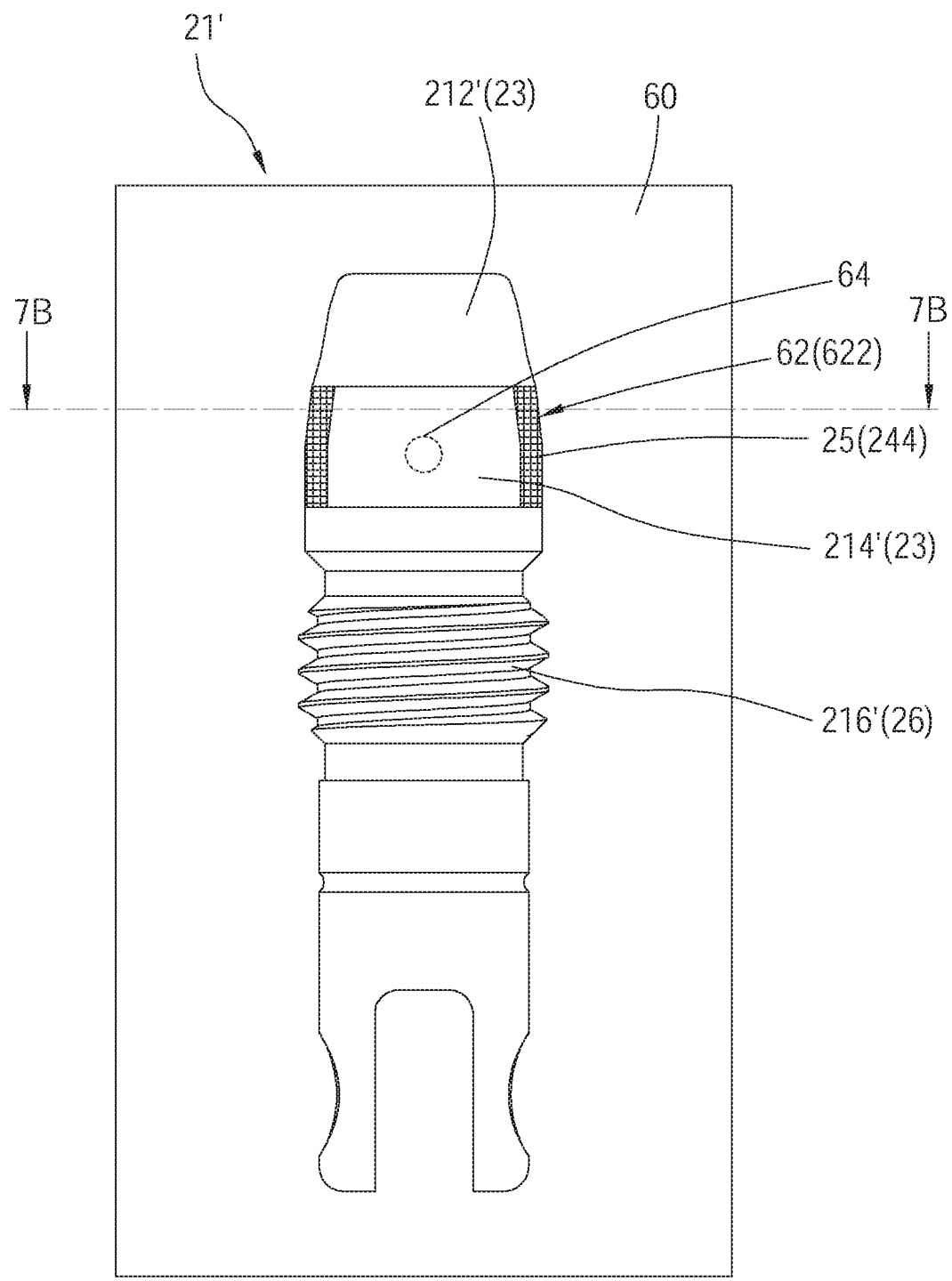
FIG. 7A is a schematic view, showing the semi-finished product of the insulating gate is disposed in the second mold.

As shown in FIG. 7A, the semi-finished product 21' has the first section 212', the second section 214', and the third section 216', wherein when the semi-finished product 21' is disposed in the second mold cavity 62 of the second mold 60, the first section 212' and the third section 216' abut against the inner wall of the second mold cavity 62, and the fourth molding space 622 is formed between the second section 214' and the inner wall of the second mold cavity 62.

Figure 7B:
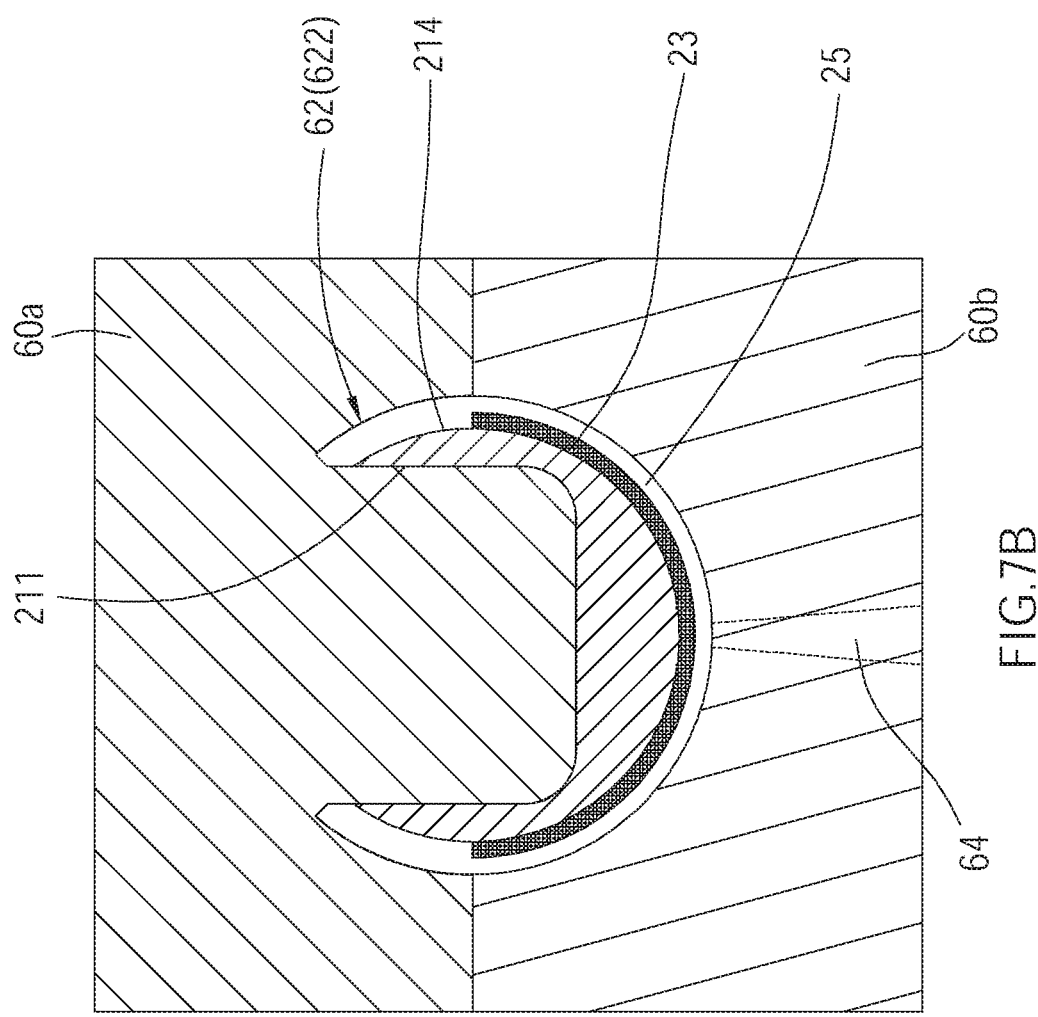
FIG. 7B is a sectional view along the 7B-7B line in FIG. 7A.

As shown in FIG. 7B, the second mold 60 includes an upper mold 60a and a lower mold 60b which could be engaged with each other to constitute the second mold 60, wherein the upper mold 60a of the second mold 60 is in contact with the inner surface of the recess 211 of the semi-finished product 21', and the fourth molding space 622 is formed between the upper mold 60a and the outer surface of the second section 214' of the semi-finished product 21' and is also formed between the lower mold 60b and the first insulating layer 23 and between the lower mold 60b and second section 214' of the semi-finished product 21'. When the second insulating material, which is plastic as an example, is injected into the second mold cavity 62 via the injecting hole 64, the second insulating material fills the fourth molding space 622, thereby to form the second insulating layer 25 on the first insulating layer 23 and the second outer surface of the second section 214 of the core material 21 of the insulating gate 20 so as to obtain the insulating gate 20. In the current embodiment, the first insulating layer 23 corresponding to the second section 214 of the core material 21 and the entire second outer surface of the second section 214 of the core material 21 of the insulating gate 20.

In the current embodiment, at least a part of the inner surface of the recess 211 is not coated with the first insulating layer 23, or is not coated with the second insulating layer 25, or is not coated with the first insulating layer 23 and the second insulating layer 25. In the current embodiment, the free end 24 has an outer surface, wherein the entire outer surface of the free end 24 corresponding to the first insulating section 242 is coated with the first insulating layer 23, thereby to form the first insulating section 242. A part of the outer surface of the free end 24 corresponding to the second insulating section 244 is coated with the first insulating layer 23, and a part of the first insulating layer 23 corresponding to the second insulating section 244 and the entire outer surface of the free end 24 corresponding to the second insulating section 244 are coated with the second insulating layer 25, thereby to form the second insulating section 244. In short, the second insulating section 244 includes the first insulating layer 23 and the second insulating layer 25, wherein the core material 21 of the insulating gate 20 corresponding to the second insulating section 244 is partially coated with the first insulating layer 23, and the core material 21 of the insulating gate 20 and the first insulating layer 23 are entirely coated with the second insulating layer 25. In the current embodiment, the color of the second insulating section 244 is different from a color of the external threaded section 26. In the current embodiment, the color of the first insulating section 242 is the same as the color of the external threaded section 26 and a color of the connecting end 22. In an embodiment, a material and the color of the first insulating layer 23 are the same as a material and the color of the external threaded section 26.

In conclusion, the insulating gate 20 includes the core material 21, the first insulating layer 23, the second insulating layer 25, the free end 24, and the connecting end 22, wherein the first insulating layer 23 is disposed on the surface of the core material 21 of the insulating gate 20, and forms the external threaded section 26 between the free end 24 and the connecting end 22, and includes the first insulating section 242 and the second insulating section 244 on the free end 24. The second insulating section 244 is located between the first insulating section 242 and the external threaded section 26. The core material 21 of the insulating gate 20 corresponding to the first insulating section 242 and a part of the core material 21 of the insulating gate 20 corresponding to the second insulating section 244 are coated with the first insulating layer 23. The first insulating layer 23 and the core material 21 of the insulating gate 20 corresponding to the second insulating section 244 are coated with the second insulating layer 25. The color of the second insulating section 244 is different from the color of the first insulating section 242.

Figure 8A:
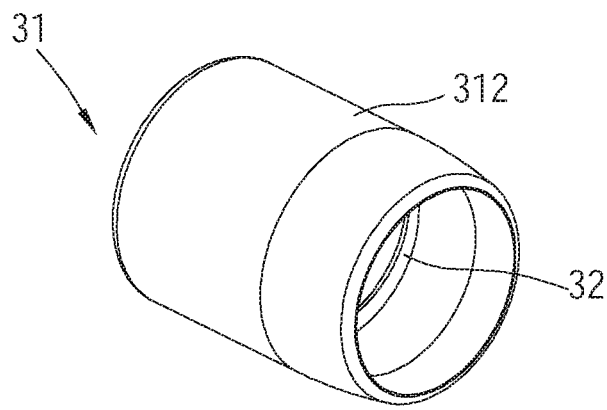
FIG. 8A is a schematic view, showing the core material of the restricting sleeve of the insulating carabiner hook according to the embodiment of the present invention.
Figure 8B:
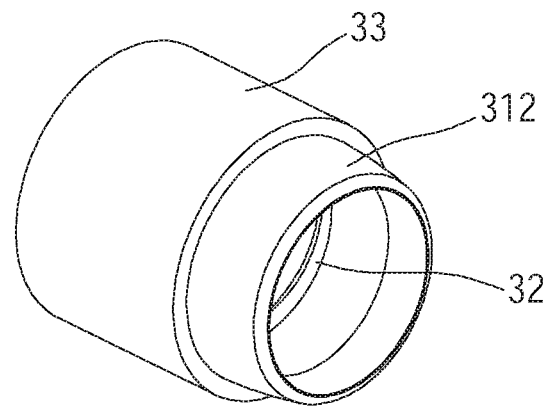
FIG. 8B is a schematic view, showing a part of the core material of the restricting sleeve of the insulating carabiner hook according to the embodiment of the present invention is coated with the first insulating layer of the restricting sleeve.
Figure 8C:
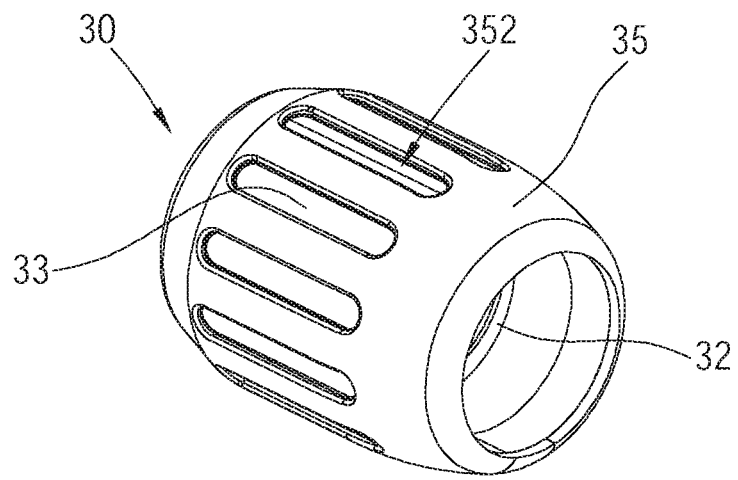
FIG. 8C is a schematic view, showing another part of the core material of the restricting sleeve of the insulating carabiner hook according to the embodiment of the present invention is coated with the second insulating layer of the restricting sleeve.

As shown in FIG. 8A to FIG. 8C, the restricting sleeve 30 includes a core material 31, a first insulating layer 33, and a second insulating layer 35, wherein the core material 31 of the restricting sleeve 30 is coated with the first insulating layer 33 and the second insulating layer 35. As shown in FIG. 8A, the core material 31 of the restricting sleeve 30 has an outer surface 312 and an internal threaded section 32. Reference is next made to FIG. 8B, a right-half portion of the core material 31 of the restricting sleeve 30 is held in a mold (not shown), so that a left-half portion of the core material 31 of the restricting sleeve 30 is suspended in the mold, and the first insulating layer 33 of the restricting sleeve 30 is formed on the outer surface 312 of the left-half portion of the core material 31 of the restricting sleeve 30. Reference is next made to FIG. 8C, the core material 31 coated with the first insulating layer 33 of the restricting sleeve 30 is held in another mold (not shown) having a plurality of positioning ribs, so that the core material 31 coated with the first insulating layer 33 of the restricting sleeve 30 is suspended in the another mold, and the second insulating layer 35 of the restricting sleeve 30 is formed on the outer surface 312 of the core material 31 of the restricting sleeve 30 and on the first insulating layer 33 of the restricting sleeve 30. In the current embodiment, a plurality of slots 352 are recessed into a surface of the second insulating layer 35 of the restricting sleeve 30 and are arranged at intervals in an annular direction surrounding the core material 31 of the restricting sleeve 30. In the current embodiment, a part of the first insulating layer 33 of the restricting sleeve 30 is exposed via the slots 352 of the second insulating layer 35 of the restricting sleeve 30. In the current embodiment, a color of the first insulating layer 33 of the restricting sleeve 30 is different from a color of the second insulating layer 35 of the restricting sleeve 30, and therefore the color of the first insulating layer 33 of the restricting sleeve 30 could be exposed via the slots 352 of the second insulating layer 35 of the restricting sleeve 30.

Figure 9B:
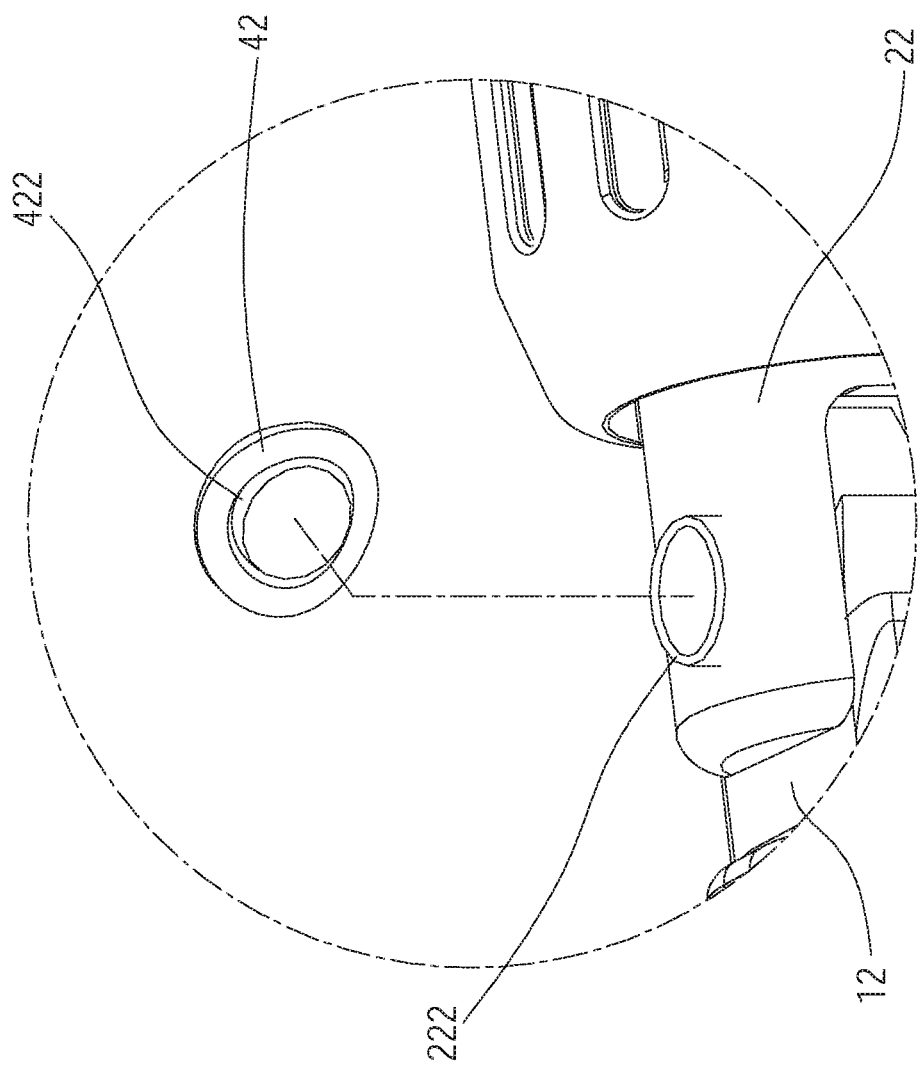
FIG. 9B is a partially enlarged view of FIG. 9A.

Reference is next made to FIG. 2 and FIG. 9A, the connecting end 22 of the insulating gate 20 is pivotally connected to the connecting portion 12 of the insulating body 10 via the pivot 40, wherein two insulating covers 42 respectively cover two ends of the pivot 40. In the current embodiment, the pivot 40 is, but not limited to, a rivet. As shown in FIG. 9B, each of the insulating covers 42 includes an annular groove 422, and each of two opposite sides of the connecting end 22 of the insulating gate 20 includes a projecting ring 222, wherein the annular groove 422 of each of the insulating covers 42 corresponds to one of the projecting rings 222. The insulating covers 42 are respectively fixed on the projecting rings 222 of the connecting end 22 via the annular grooves 422 by an ultrasonic welding process.

With the aforementioned design, the user could easily identify whether the insulating carabiner hook is properly locked to be the safety state or not through the different colors between the first insulating section and the second insulating section and with the easy security checking process, thereby to protect the safety of the user and enhance the convenience of use. In addition, the entire outer surface of the insulating carabiner hook is coated with the insulating material, thereby to avoid electric shock or electric conduction occurring on the carabiner hook, providing further safety protection for electric maintenance staffs.

It must be pointed out that the embodiments described above are only some embodiments of the present invention. All equivalent structures and methods which employ the concepts disclosed in this specification and the appended claims should fall within the scope of the present invention.

What is claimed is:

1. An insulating carabiner hook, comprising:
an insulating body having a connecting portion and an abutting portion respectively located on two opposite ends of the insulating body;
an insulating gate having a connecting end, a free end, and an external threaded section, wherein the external threaded section is located between the connecting end and the free end; the insulating gate is pivotally connected to the connecting portion of the insulating body via the connecting end, thereby the insulating gate is pivotable to be pivot relative to the insulating body; the free end is operable to be abutted against or away from the abutting portion of the insulating body, and comprises a first insulating section and a second insulating section; the second insulating section is located between the first insulating section and the external threaded section; a color of the second insulating section is different from a color of the first insulating section; and
a restricting sleeve having an internal threaded section and fitting around the insulating gate, wherein the internal threaded section is screwed with the external threaded section of the insulating gate; the restricting sleeve is operable to rotate, thereby the restricting sleeve is movable to be moved in an axial direction of the insulating gate;
wherein when the free end abuts against the abutting portion of the insulating body, and the restricting sleeve completely covers the second insulating section and covers at least a part of the abutting portion of the insulating body, the restricting sleeve is defined as being located in a safe position, and at this time, the insulating gate cannot freely pivot; when the free end abuts against the abutting portion of the insulating body and at least a part of the second insulating section of the insulating gate is exposed via the restricting sleeve, the restricting sleeve is defined as being located at a warning position; and
wherein when the free end abuts against the abutting portion of the insulating body, and the restricting sleeve is located at the warning position, at least the part of the second insulating section of the insulating gate is exposed via the restricting sleeve, and the free end cannot firmly abut against the abutting portion.

2. The insulating carabiner hook of claim 1, wherein when the free end abuts against the abutting portion of the insulating body, and the restricting sleeve is located at the warning position, at least the part of the second insulating section of the insulating gate is exposed via the restricting sleeve, and the insulating gate is pivotable to pivot relative to the insulating body.

3. The insulating carabiner hook of claim 1, wherein the restricting sleeve comprises a core material and an insulating layer; the core material is coated with the insulating layer; the insulating layer has a plurality of slots which are recessed into a surface of the insulating layer and are arranged at intervals in an annular direction surrounding the core material.

4. The insulating carabiner hook of claim 1, wherein the insulating gate comprises a core material and an insulating layer; the core material is coated with the insulating layer; the insulating layer comprises the first insulating section, the second insulating section, the external threaded section, and the connecting end in order from the free end to the connecting end; a part of the core material corresponding to the connecting portion of the insulating body is coated with the connecting end of the insulating layer; a color of the external threaded section and a color of the connecting end are different from the color of the second insulating section.

5. The insulating carabiner hook of claim 4, wherein the color of the first insulating section is the same as the color of the external threaded section and the color of the connecting end.

6. The insulating carabiner hook of claim 4, wherein the second insulating section comprises a first insulating layer and a second insulating layer; a part of the core material corresponding to the second insulating section is partially coated with the first insulating layer; the first insulating layer and a part of the core material corresponding to the second insulating section are entirely coated with the second insulating layer.

7. The insulating carabiner hook of claim 6, wherein a material of the first insulating layer and a color of the first insulating layer are the same as a material of the external threaded section and the color of the external threaded section.

8. An insulating carabiner hook, comprising:
an insulating body having a connecting portion and an abutting portion respectively located on two opposite ends of the insulating body;
an insulating gate having a connecting end, a free end, and an external threaded section, wherein the external threaded section is located between the connecting end and the free end; the insulating gate is pivotally connected to the connecting portion of the insulating body via the connecting end, thereby the insulating gate is pivotable to be pivot relative to the insulating body; the free end is operable to be abutted against or away from the abutting portion of the insulating body, and comprises a first insulating section and a second insulating section; the second insulating section is located between the first insulating section and the external threaded section; a color of the second insulating section is different from a color of the first insulating section; and
a restricting sleeve having an internal threaded section and fitting around the insulating gate, wherein the internal threaded section is screwed with the external threaded section of the insulating gate; the restricting sleeve is operable to rotate, thereby the restricting sleeve is movable to be moved in an axial direction of the insulating gate;
wherein when the free end abuts against the abutting portion of the insulating body, and the restricting sleeve completely covers the second insulating section and covers at least a part of the abutting portion of the insulating body, the restricting sleeve is defined as being located in a safe position, and at this time, the insulating gate cannot freely pivot; when the free end abuts against the abutting portion of the insulating body and at least a part of the second insulating section of the insulating gate is exposed via the restricting sleeve, the restricting sleeve is defined as being located at a warning position; and wherein the insulating body comprises a core material and an insulating layer; the core material is coated with the insulating layer; a part of the core material located at the abutting portion is not entirely coated by the insulating layer, thereby the part of the core material located at the abutting portion is exposed out.

9. An insulating carabiner hook, comprising:

an insulating body having a connecting portion and an abutting portion respectively located on two opposite ends of the insulating body;

an insulating gate having a connecting end, a free end, and an external threaded section, wherein the external threaded section is located between the connecting end and the free end; the insulating gate is pivotally connected to the connecting portion of the insulating body via the connecting end, thereby the insulating gate is pivotable to be pivot relative to the insulating body; the free end is operable to be abutted against or away from the abutting portion of the insulating body, and comprises a first insulating section and a second insulating section; the second insulating section is located between the first insulating section and the external threaded section; a color of the second insulating section is different from a color of the first insulating section; and a restricting sleeve having an internal threaded section and fitting around the insulating gate, wherein the internal threaded section is screwed with the external threaded section of the insulating gate; the restricting sleeve is operable to rotate, thereby the restricting sleeve is movable to be moved in an axial direction of the insulating gate;

wherein when the free end abuts against the abutting portion of the insulating body, and the restricting sleeve completely covers the second insulating section and covers at least a part of the abutting portion of the insulating body, the restricting sleeve is defined as being located in a safe position, and at this time, the insulating gate cannot freely pivot; when the free end abuts against the abutting portion of the insulating body and at least a part of the second insulating section of the insulating gate is exposed via the restricting sleeve, the restricting sleeve is defined as being located at a warning position; and wherein the connecting end of the insulating gate is pivotally connected to the connecting portion of the insulating body via a pivot, two insulating covers respectively cover two ends of the pivot.

10. The insulating carabiner hook of claim 9, wherein each of the insulating covers comprises an annular groove; each of two opposite sides of the connecting end of the insulating gate comprises a projecting ring; the annular groove of each of the insulating covers corresponds to one of the projecting rings; the insulating covers are respectively fixed on the projecting rings of the connecting end via the annular grooves by an ultrasonic welding process.

11. An insulating gate for a carabiner hook, comprising a core material, a first insulating layer, and a second insulating layer, wherein the core material comprises a free end and a connecting end; the first insulating layer is provided on a surface of the core material, and forms an external threaded section between the free end and the connecting end; the first insulating layer comprises a first insulating section and a second insulating section on the free end; the second insulating section is located between the first insulating section and the external threaded section; a part of the core material corresponding to the first insulating section is coated with the first insulating layer, and a part of the core material corresponding to the second insulating section is partially coated with the first insulating layer; a part of the first insulating layer corresponding to the second insulating section is coated with the second insulating layer, and a part of the core material corresponding to the second insulating section is coated with the second insulating layer; a color of the second insulating section is different from a color of the first insulating section.

12. The insulating gate of claim 11, wherein the free end has an outer surface; a part of the outer surface of the free end corresponding to the first insulating section is entirely coated with the first insulating layer, and a part of the outer surface of the free end corresponding to the second insulating section is partially coated with the first insulating layer; a part of the first insulating layer corresponding to the second insulating section is coated with the second insulating layer, and a part of the outer surface of the free end corresponding to the second insulating section is entirely coated with the second insulating layer.

13. The insulating gate of claim 11, wherein the color of the second insulating section is different from a color of the external threaded section.

14. The insulating gate of claim 13, wherein the free end has a recess having an inner surface; at least a part of the inner surface of the recess is not coated with at least one of the first insulating layer and the second insulating layer.

15. The insulating gate of claim 11, wherein the color of the first insulating section is the same as a color of the external threaded section.

* * * * *